United States Patent
Lee et al.

(10) Patent No.: US 9,899,951 B2
(45) Date of Patent: Feb. 20, 2018

(54) METHODS AND APPARATUS FOR CONTROLLING AN INVERTER OF A MOTOR DRIVING APPARATUS

(71) Applicant: LG ELECTRONICS INC., Seoul (KR)

(72) Inventors: Gilsu Lee, Seoul (KR); Naechun Park, Seoul (KR); Kyunghoon Lee, Seoul (KR); Sungbae Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 15/041,659

(22) Filed: Feb. 11, 2016

(65) Prior Publication Data
US 2016/0233812 A1    Aug. 11, 2016

(30) Foreign Application Priority Data
Feb. 11, 2015  (KR) .................. 10-2015-0021097

(51) Int. Cl.
| | |
|---|---|
| *H02P 21/00* | (2016.01) |
| *H02P 27/08* | (2006.01) |
| *H02P 21/22* | (2016.01) |
| *H02P 21/18* | (2016.01) |
| *H02P 6/16* | (2016.01) |
| *H02P 1/04* | (2006.01) |
| *H02P 21/24* | (2016.01) |

(52) U.S. Cl.
CPC ............ *H02P 27/08* (2013.01); *H02P 1/04* (2013.01); *H02P 6/16* (2013.01); *H02P 21/18* (2016.02); *H02P 21/22* (2016.02); *H02P 21/24* (2016.02)

(58) Field of Classification Search
CPC ................... H02P 27/08; H02P 21/18
USPC ..................................... 318/400.02
See application file for complete search history.

(56) References Cited

U.S. PATENT DOCUMENTS

| | | | | |
|---|---|---|---|---|
| 5,723,967 A | * | 3/1998 | Hongo | H02P 6/21 318/400.11 |
| 2005/0258788 A1 | * | 11/2005 | Mori | H02P 6/20 318/400.12 |
| 2008/0252242 A1 | * | 10/2008 | Akama | H02P 6/06 318/400.14 |

FOREIGN PATENT DOCUMENTS

| | | |
|---|---|---|
| CN | 103501151 A | 1/2014 |
| JP | 2009-71904 A | 4/2009 |
| JP | 2014-138539 A | 7/2014 |

OTHER PUBLICATIONS

Gun-Myoung Kim et al., "An Improved Back-EMF based Initial Rotor Position Estimation for IPMSM", 8th International Conference on Power Electronics—ECCE Asia, May 30-Jun. 3, 2011, The Shilla Jeju, Korea, pp. 1244-1249, XP31956292A.

(Continued)

*Primary Examiner* — Erick Glass
(74) *Attorney, Agent, or Firm* — Dentons US LLP

(57) ABSTRACT

A motor driving apparatus including a motor including a stator and a rotor rotating in the stator, an inverter configured to supply a driving voltage to a stator coil wound on the stator so as to rotate the rotor, and a control unit configured to, when a target command value is received, change a predetermined reference start-up time point to a start-up time point corresponding to an electrical angle position of the rotor in correspondence with the target command value per rotation of the rotor and to control the inverter to supply the driving voltage at the start-up time point.

15 Claims, 5 Drawing Sheets

(56) References Cited

OTHER PUBLICATIONS

Jin Yong-Sin et al., "Torque Ripple Reduction based on Flux Linkage Harmonics Observer for an Interior PM Synchronous Motor including Back EMF Harmonics", The Korean Institute of Power Electronics, The Transactions of Korean Institute of Power Electronics, Aug. 2013, 18(4), p. 367-375.

* cited by examiner

METHODS AND APPARATUS FOR CONTROLLING AN INVERTER OF A MOTOR DRIVING APPARATUS

CROSS-REFERENCE TO RELATED APPLICATION

This application claims the priority benefit of Korean Patent Application No. 10-2015-0021097, filed on Feb. 11, 2015 in the Korean Intellectual Property Office, the disclosure of which is incorporated herein by reference.

BACKGROUND

1. Field

Embodiments relate to a motor driving apparatus.

2. Description of the Related Art

Small precision motors are typically categorized as alternating current (AC) motors, direct current (DC) motors, brushless DC motors or reluctance motors.

Such small motors are widely used in AV apparatuses, computers, home appliances, housing facilities and industrial facilities. In particular, home appliances form the largest market for small motors. The quality of home appliances is gradually improving and downsizing, low noise and low power consumption of motors driven in home appliances are required.

A BLDC motor does not have a brush and a commutator, does not cause mechanical friction loss, sparks, or noise, and is excellent speed control and torque control. In addition, speed control does not result in loss and the BLDC motor benefits from a high efficiency as result of a small motor size. In addition, since BLDC motors can be easily downsized, have high durability, long lifespans, and do not require maintenance, BLDC motors have gradually become widely used in home appliances.

Recently, research into diversification of a signal pattern of a pulse width modulation (PWM) signal for controlling an inverter for providing a three-phase ac voltage to a BLDC motor has been conducted.

SUMMARY

Therefore, the present invention has been made in view of the above problems, and it is an object of the present invention to provide a motor driving apparatus capable of changing ON and OFF periods of a PWM signal according to a lead angle and an electrical angle position of a rotor included in a motor to drive a motor at maximum output.

An object of the present invention is to provide a motor driving apparatus including a motor including a stator and a rotor rotating in the stator, an inverter configured to supply a driving voltage to a stator coil wound on the stator so as to rotate the rotor, and a control unit configured to, when a target command value is received, change a predetermined reference start-up time point to a start-up time point corresponding to an electrical angle position of the rotor in correspondence with the target command value per rotation of the rotor and to control the inverter to supply the driving voltage at the start-up time point.

Another object of the present invention is to provide a motor driving apparatus including a motor including a stator and a rotor rotating in the stator, an inverter configured to supply a driving voltage to a stator coil wound on the stator or to cut off the driving voltage supplied to the stator coil, and a control unit configured to, when a target command value is received, set a start-up period for supplying the driving voltage per rotation of the rotor, according to an electrical angle position of the rotor estimated based on at least one of a voltage, current and counter electromotive force detected in the stator coil and the target command value, and to control the inverter to supply the driving voltage in the start-up period.

BRIEF DESCRIPTION OF THE DRAWINGS

The above and other objects, features and advantages of the present invention will be more clearly understood from the following detailed descriptions and accompanying drawings.

DETAILED DESCRIPTION OF THE PREFERRED EMBODIMENTS

Figure 1:
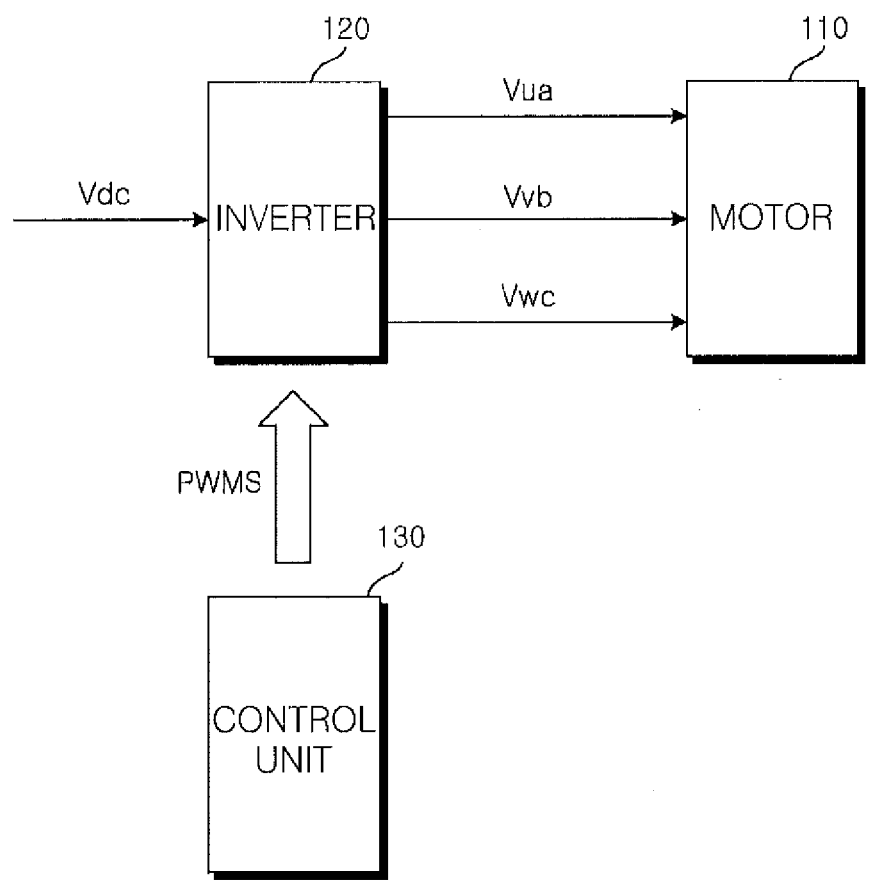
FIG. 1 is a block diagram showing the control configuration of a motor driving apparatus according to a first embodiment.

Advantages and features of the present invention and methods for achieving them may become apparent upon referring to embodiments described below and attached drawings. However, embodiments are not limited to the embodiments disclosed hereinafter, and may be embodied in different modes. The descriptions of the embodiments below are provided for perfection of disclosure and describing the scope of the invention to persons skilled in this field of art. The same reference numerals may refer to similar or equivalent elements of different embodiments throughout the specification.

Unless otherwise defined, all terms (including technical and scientific terms) used herein have the same meaning as commonly understood by one of ordinary skill in the art to which the example embodiments pertain. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Hereinafter, embodiments will be described in detail with reference to the drawings.

FIG. 1 is a block diagram showing the control configuration of a motor driving apparatus according to a first embodiment.

Referring to FIG. 1, the motor driving apparatus 100 may include a motor 110, an inverter 120 and a control unit 130.

The motor 110 may include a stator, on which a stator coil is wound, and a rotor provided in the stator and rotated by a magnetic field generated in the stator coil.

Although the motor 110 may be an induction motor, a brushless DC (BLDC) motor or a reluctance motor, it is assumed that the motor is a BLDC motor in this embodiment.

In the motor 110, when three-phase ac driving voltages Vua, Vvb and Vwc are supplied from the inverter 120 to the stator coil, a permanent magnet included in the rotor rotates according to the magnetic field generated in the stator coil.

The inverter 120 may include three-phase switching elements (not shown).

When an operation control signal (hereinafter, referred to as a pulse width modulation (PWM) signal PWMS) is received from the control unit 130, the three-phase switching elements may be switched on or off to convert a received dc voltage Vdc into the three-phase ac driving voltages Vua, Vvb and Vwc and to supply the three-phase ac driving voltages Vua, Vvb and Vwc to the stator coil.

The three-phase switching elements will be described in detail below.

When a target command value is received, the control unit 120 may change a start-up period for supplying the three-phase ac driving voltages Vua, Vvb and Vwc for the motor 110 to attain maximum power per rotation of the rotor according to an optimal driving point. The optimal driving point may be calculated based on the target command value and the electrical angle position of the rotor estimated based on at least one of the voltage, current and counter electromotive force detected in the stator coil. A PWM signal (PWMS) may then be outputted to the inverter 120 so as to supply the three-phase ac driving voltages Vua, Vvb and Vwc in the start-up period.

That is, the control unit 130 may output the PWM signal PWMS in correspondence with the start-up period for supplying the three-phase ac driving voltages Vua, Vvb and Vwc according to the target command value and the electrical angle position of the rotor, without being limited thereto.

At this time, the PWM signal may be supplied once per rotation of the rotor according to the electrical angle. The control unit 130 will be described in detail below.

Figure 2:
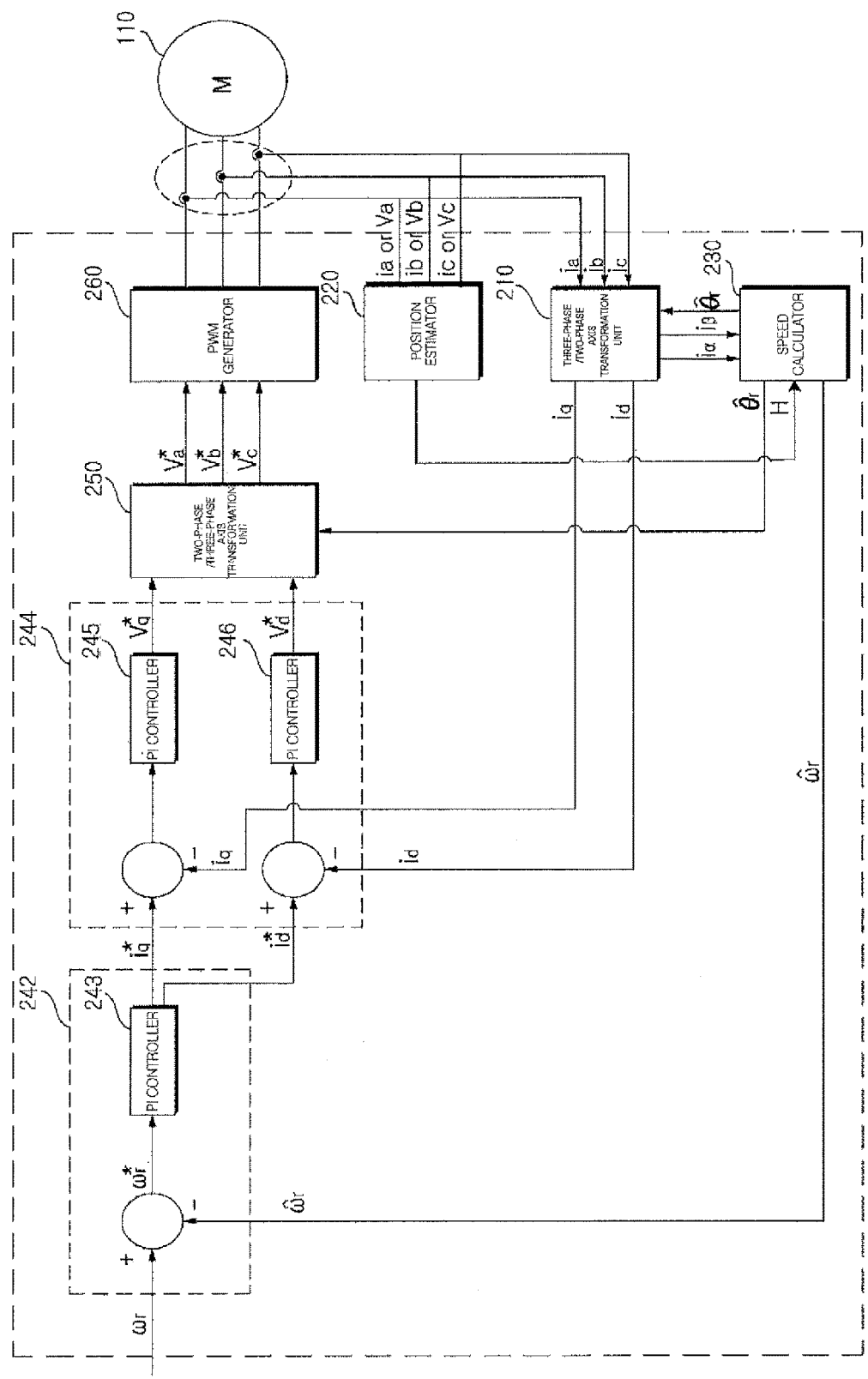
FIG. 2 is a block diagram showing the control configuration of a control unit shown in FIG. 1.

FIG. 2 is a block diagram showing the control configuration of the control unit shown in FIG. 1.

Referring to FIG. 2, the control unit 130 may include a three-phase/two-phase axis transformation unit 210, a position estimator 220, a speed calculator 230, a command value generator 240, a two-phase/three-phase axis transformation unit 250 and a signal generator (hereinafter, referred to as a PWM generator) 260.

The three-phase/two-phase axis transformation unit 210 receives and transforms three-phase currents ia, ib, ic output from the motor 110 into two-phase currents iα and iβ of a stationary coordinate system.

The three-phase/two-phase axis transformation unit 210 may transform two-phase currents iα and iβ of the stationary coordinate system into two-phase currents id and iq of a rotating coordinate system.

The position estimator 220 may detect at least one of three-phase currents ia, ib and ic and three-phase voltages Va, Vb and Vc and counter electromotive force (not shown) and estimate an electrical angle position H of the rotor included in the motor 110.

The speed calculator 230 may calculate the current speed $\hat{\omega}_r$ of the rotor based on at least one of the position H estimated by the position estimator 220 and the three-phase voltages Va, Vb and Vc. That is, the speed calculator 230 may divide the position H by time to calculate the current speed $\hat{\omega}_r$.

In addition, the speed estimator 230 may calculate and output an electrical angle position $\hat{\theta}_r$ and current speed $\hat{\omega}_r$ based on the position H.

The command generator 240 may include a current command generator 242 and a voltage command generator 244.

The current command generator 242 calculates a speed command value $\omega^*_r$ based on the calculated current speed $\hat{\omega}_r$ and a command speed ω corresponding to the received target command value.

The current command generator 242 then generates a current command value $i^*_q$ based on the speed command value $\phi w^*_r$.

For example, the current command generator 242 may perform PI control in a PI controller 243 based on the speed command value $\omega^*_r$, which constitutes a difference between the current speed $\hat{\omega}_r$ and the command speed ω, and generate a current command value $i^*_q$. Although the q-axis current command value $i^*_q$ is used as the current command value in the figure, a d-axis current command value $i^*_d$ may also be generated. The d-axis current command value $i^*_d$ may be set to 0.

The current command generator 242 may further include a limiter (not shown) for limiting the level of the current command value $i^*_q$ so as to not exceed an allowable range.

Next, the voltage command generator 244 generates d-axis and q-axis voltage command values $V^*_d$ and $V^*_q$ based on the d-axis and q-axis currents $i_d$ and $i_q$ axis-transformed into the rotating coordinate system and the current command values $i^*_d$ and $i^*_q$ from the current command generator 242.

For example, the voltage command generator 244 may perform PI control in the PI controller 245 based on a difference between the q-axis current $i_q$ and the q-axis current command value $i^*_q$ and generate the q-axis voltage command value $V^*_q$.

In addition, the voltage command generator 244 may perform PI control in the PI controller 246 based on a difference between the d-axis current $i_d$ and the d-axis current command value $i^*_d$ and generate the d-axis voltage command value $V^*_d$.

The d-axis voltage command value $V^*_d$ may be set to 0 when the d-axis current command value $i^*_d$ is set to 0.

The voltage command generator 244 may further include a limiter (not shown) for limiting the levels of the d-axis and q-axis voltage command values $V^*_d$ and $V^*_q$ so as to not exceed an allowable range.

The generated d-axis and q-axis voltage command values $V^*_d$ and $V^*_q$ are then input to the two-phase/three-phase axis transformation unit 250.

The two-phase/three-phase axis transformation unit 250 receives the electrical angle position $\hat{\theta}_r$ calculated by the speed calculator 230 and the d-axis and q-axis voltage command values $V^*_d$ and $V^*_q$ and performs axis transformation.

First, the two-phase/three-phase axis transformation unit 250 performs transformation from the two-phase rotating coordinate system to the two-phase stationary coordinate system. At this time, the electrical angle position $\hat{\theta}_r$ calculated by the speed calculator 230 may be used.

The two-phase/three-phase axis transformation unit 250 performs transformation from the two-phase stationary coordinate system to the three-phase stationary coordinate system. Through such transformation, the two-phase/three-phase axis transformation unit 250 outputs three-phase output voltage command values V*a, V*b and V*c.

The PWM generator 260 generates and outputs the PWM signal PWMS for the inverter according to the PWM method based on the three-phase output voltage command values V*a, V*b and V*c generated by the current command values $i^*_d$, $i^*_q$ and the voltage command values $V^*_d$ and $V^*_q$.

The PWM signal PWMS may be transformed into a gate driving signal by a gate driving unit (not shown) and input to the gates of the three-phase switching elements of the inverter 120. The three-phase switching elements of the inverter 120 may perform switching operation.

The PWM generator 260 may change a reference start-up period for supplying the PWM signal PWMS based on the electrical angle position $\hat{\theta}_r$ and the three-phase voltages Va, Vb and Vc to the start-up period corresponding to the electrical angle position $\hat{\theta}_r$ and control the three-phase switching elements to be switched on and off once in the start-up period per rotation of the rotor according to the electrical angle.

The PWM generator 260 may change a reference driving time point and reference driving time included in the reference start-up period to a start-up time point and start-up time for supplying the driving voltage, based on the electrical angle position of $\hat{\theta}_r$ the rotor and the lead angles of the three-phase voltages Va, Vb and Vc, and generate and output the PWM signal PWMS corresponding to the start-up period including the start-up time point and the start-up time.

In addition, the PWM generator 260 may change the reference start-up time point and reference start-up time included in the reference start-up period to the start-up time point and start-up time for supplying the driving voltage, based on the electrical angle position $\hat{\theta}_r$ of the rotor and the lag angles of the three-phase voltages Va, Vb and Vc, and generate and output the PWM signal PWMS corresponding to the start-up period including the start-up time point and the start-up time.

In addition, the PWM generator 260 compensates for the electrical angle position $\hat{\theta}_r$ of the rotor based on the lead angles and duty ratio of the three-phase voltages Va, Vb and Vc, changes the reference start-up time point and reference start-up time included in the reference start-up period to the start-up time point and start-up time for supplying the driving voltage, according to the compensated electrical angle position of the rotor, and generates and outputs the PWM signal PWMS corresponding to the start-up period including the start-up time point and the start-up time.

The PWM generator 260 may use a plurality of algorithms to generate the PWM signal PWMS, to change the start-up time point, the start-up time and an off time for cutting off the driving voltage, per rotation of the rotor, and to calculate an output power value corresponding to the target command value, to thereby calculate the optimal driving point.

That is, the PWM generator 260 may calculate the maximum power value according to Equation 1 below.

$$P=3/2(v_d i_d + v_q i_q) \quad \text{Equation 1}$$

where, P denotes the output power value, $v_d$ denotes the d-axis voltage command value of the voltage command values, $i_d$ denotes the d-axis current command value of the current command values, $v_q$ denotes the q-axis voltage command value of the voltage command values and $i_q$ denotes the q-axis current command value of the current command values.

At this time, the PWM generator 260 may change the reference start-up time point and reference start-up time included in the reference start-up period to the start-up time point and start-up time for supplying the three-phase voltages Va, Vb and Vc, according to the electrical angle position $\hat{\theta}_r$ of the rotor and the output power value, without being limited thereto.

The start-up time may be equal to or less than the off time, without being limited thereto.

Figure 3:
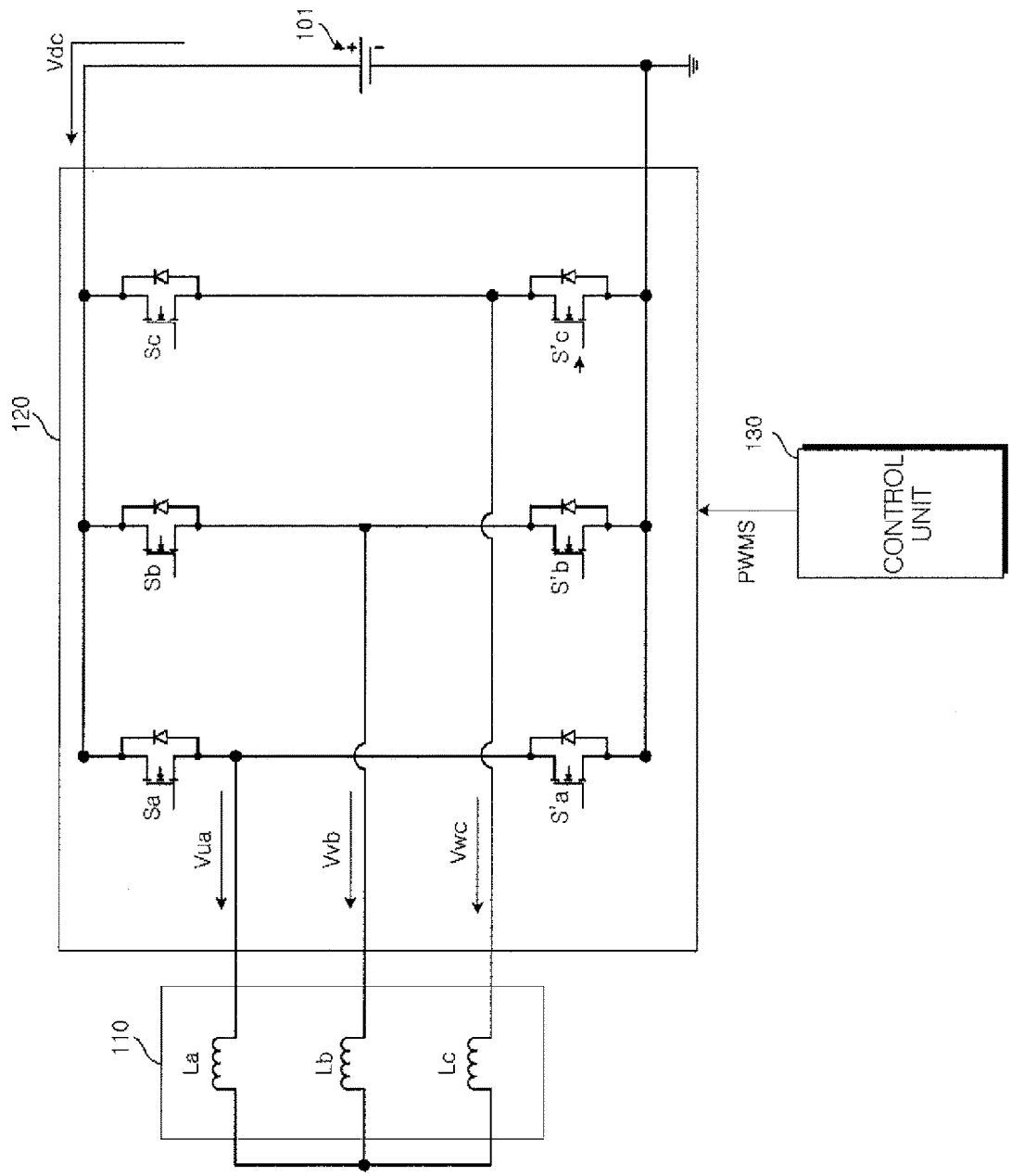
FIG. 3 is a circuit diagram showing a driving circuit of the motor driving apparatus according to the first embodiment.

FIG. 3 is a circuit diagram showing a driving circuit of the motor driving apparatus according to the first embodiment.

Referring to FIG. 3, the driving circuit may include a motor 110, an inverter 120 and a control unit 130.

Here, a power source 101 for supplying a dc voltage Vdc to the inverter 120 may be provided in the front stage of the inverter 120.

The power source 101 may be a battery power source for supplying the dc voltage Vdc, without being limited thereto.

If the power source 101 supplies a single-phase or three-phase ac voltage, a rectifier (not shown) for rectifying the ac voltage to the dc voltage Vdc may be provided between the power source 101 and the inverter 120. The rectifier may be a bridge rectification circuit, without being limited thereto.

The inverter 120 may include three-phase switching elements, and may be switched on and off by the PWM signal PWMS supplied from the control unit 130 to convert the dc voltage Vdc into three-phase ac voltages Vua, Vvb and Vwc having a predetermined frequency and duty ratio and to output the three-phase ac voltages Vua, Vvb and Vwc to the motor 110.

In the three-phase switching elements, first to third upper-arm switches S'a, S'b and S'c and first to third lower-arm switches S'a, S'b and S'c respectively connected in series form respective pairs and a total of three pairs of first to third upper-arm and lower-arm switches are connected in parallel (Sa&S'a, Sb&S'b, Sc&S'c).

That is, the first upper-arm and lower-arm switches Sa and S'a supply a first phase ac voltage Vua of the three-phase ac voltages Vua, Vvb and Vwc to the first coil La of the stator coils La, Lb and Lc of the motor 110.

In addition, the second upper-arm and lower-arm switches Sb and S'b may supply a second phase ac voltage Vvb to the second coil Lb and the third upper-arm and lower-arm switches Sc and S'c may supply a third phase ac voltage Vwc to the third coil Lc.

The first to third upper-arm switches Sa, Sb and Sc and the first to third lower-arm switches S'a, S'b and S'c are switched on and off once according to the received PWM signal PWMS per rotation of the rotor, such that the three-phase ac voltages Vua, Vvb and Vwc are respectively supplied to the stator coils La, Lb and Lc.

At this time, the ON period of the first upper-arm switch Sa may partially overlap with that of at least one of the second and third upper-arm switches Sb and Sc, without being limited thereto.

In addition, the ON period of the first upper-arm switch Sa may partially overlap with that of the third lower-arm switch S'c.

Although the ON period of the first upper-arm switch Sa of the first to third upper-arm switches Sa, Sb and Sc was described above, the same descriptions apply to the operations of the other upper-arm switches.

The control unit 130 may deliver the PWM signal PWMS to the first to third upper-arm switches Sa, Sb and Sc and the first to third lower-arm switches S'a, S'b and S'c and control the three-phase ac voltages Vua, Vvb and Vwc to be supplied to the stator coils La, Lb and Lc, as described above with reference to FIG. 2.

Figure 4:
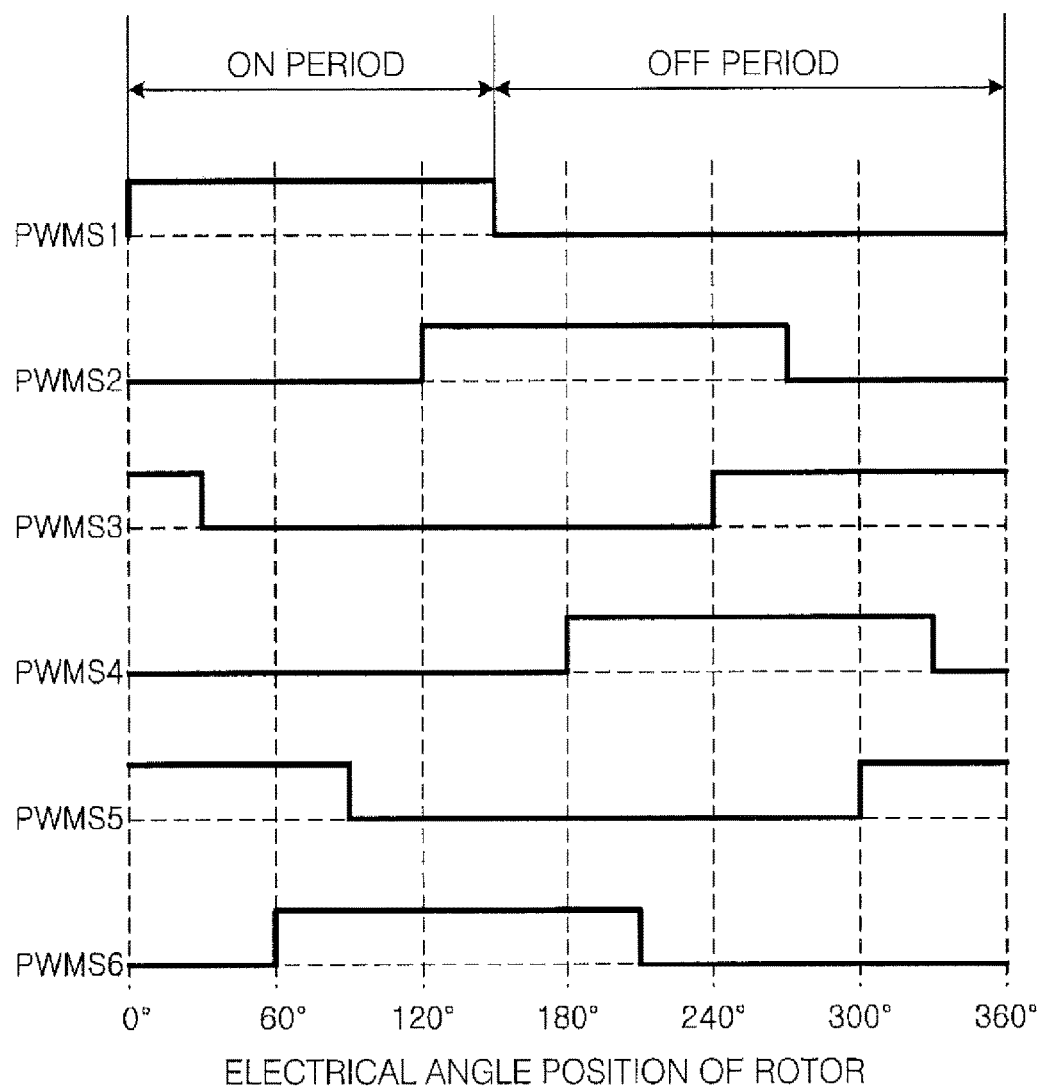
FIG. 4 is a diagram showing the signal pattern of a PWM signal of the motor driving apparatus according to the first embodiment.

FIG. 4 is a diagram showing the signal pattern of a PWM signal of the motor driving apparatus according to the first embodiment.

FIG. 4 shows timings of first to sixth PWM signals PWMS1, PWMS2, PWMS3, PWMS4, PWMS5 and PWMS6 input to the first to third upper-arm switches Sa, Sb and Sc and the first to third lower-arm switches S'a, S'b and S'c according to the electrical angle position of the rotor.

In addition, FIG. 4 shows the signal pattern based on the first upper-arm switch Sa, without being limited thereto.

That is, referring to FIG. 4, the first PWM signal PWM1 may include an ON period in which the electrical angle position of the rotor is in a range from 0° to 150° and an OFF period in which the electrical angle position of the rotor is in a range from 150° to 360°.

At this time, the first upper-arm switch Sa may be switched on in the ON period of the first PWM signal PWMS to supply the first phase ac voltage Vua such that first phase current ia is supplied to the first coil La.

Thereafter, the first upper-arm switch Sa may be switched off in the OFF period of the first PWM signal PWMS to cut off the first phase ac voltage Vua supplied to the first coil La.

Thereafter, the second and third upper-arm switches Sb and Sc and the first to third lower-arm switches S'a, S'b and S'c may be switched on and off by the second to sixth PWM signals PWMS2 to PWMS6.

At this point, the control unit 130 may change the duty ratio or frequency of the first to sixth PWM signals PWMS1 to PWMS6 equally to the frequency of the three-phase voltages Va, Vb and Vc of the motor 110, such that the current speed $\omega_r$ of the motor 110 is changed in correspondence with the command speed $\omega$, as described above with reference to FIG. 2, when deciding the ON and OFF periods of the first to sixth PWM signals PWMS1 to PWMS6.

For example, the control unit 130 may decrease the duty ratio of the first to sixth PWM signals PWMS1 to PWMS6, when the motor 110 rotates at a low speed according to the command speed $\omega$. That is, the control unit 130 changes the ON period of the first to sixth PWM signals PWMS1 to PWMS6 to a period in which the electrical angle position of the rotor is in a range from 0° to 60°, which is less than a range from 0° to 150°.

Thereafter, the control unit 130 may change the ON period of the first to sixth PWM signals PWMS1 to PWMS6 to a period in which the electrical angle position of the rotor is in a range from 0° to 180°, which is greater than a range from 0° to 150°, when the motor 110 rotates at a high speed according to the command speed $\omega$.

That is, the control unit 130 changes the supply times of the three-phase ac voltages Vua, Vvb and Vwc according to the command value $\omega$ of the motor 110 to change the ON period in correspondence with the electrical angle position of the rotor such that the motor 110 has maximum power according to the command speed $\omega$.

In addition, the ON period of the first PWM signal PWMS1 may partially overlay that of the second PWM signal PWMS2 and that of the sixth PWM signal PWSM6 and the on operations of the first and second upper-arm switches Sa and Sb and the third lower-arm switch S'c partially overlap, without being limited thereto.

Figure 5:
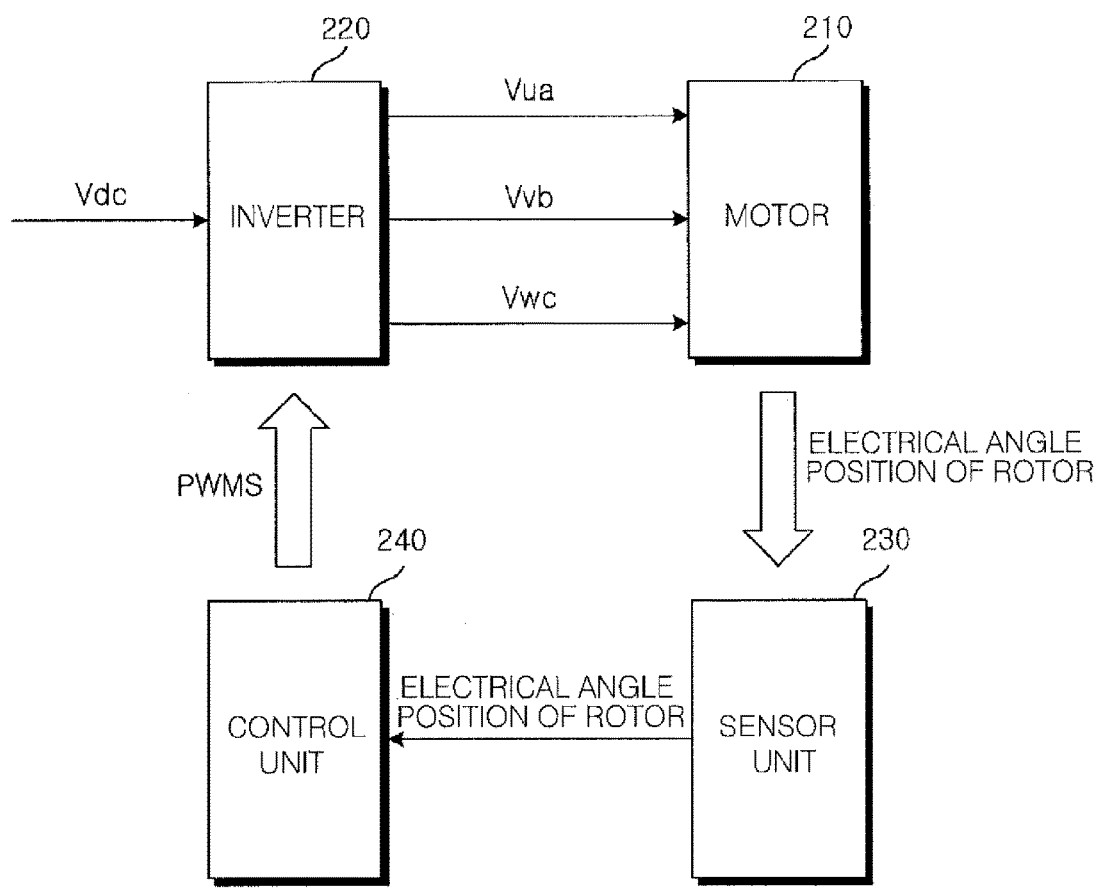
FIG. 5 is a block diagram showing the control configuration of a motor driving apparatus according to a second embodiment.

FIG. 5 is a block diagram showing the control configuration of a motor driving apparatus according to a second embodiment.

Referring to FIG. 5, the motor driving apparatus may include a motor 210, an inverter 220, a sensor unit 230 and a control unit 240.

The motor 210 may include a stator, on which a stator coil (not shown) is wound, and a rotor provided in the stator and rotated by a magnetic field generated in the stator coil. The motor 210 is equivalent to the motor 110 shown in FIG. 1 and thus a detailed description thereof will be omitted.

The inverter 220 may include three-phase switching elements (not shown), as in the inverter 110 shown in FIG. 1.

When an operation control signal (hereinafter, referred to as a PWM signal PWMS) is received from the control unit 240, the three-phase switching elements may be switched on and off to convert the received dc voltage Vdc into three-phase ac driving voltages Vua, Vvb and Vwc and to supply the three-phase ac driving voltages Vua, Vvb and Vwc to the stator coil. Here, the description of the three-phase switching elements will be omitted.

The sensor unit 230 may include at least one Hall sensor (not shown) for measuring the electrical angle position of the rotor. The at least one Hall sensor detects and outputs the electrical angle position of the rotor to the control unit 240.

When a target command value is received, the control unit 240 may change a predetermined reference start-up time point into a start-up time point corresponding to the electrical angle position of the rotor measured by the sensor unit 230 in correspondence with the target command value per rotation of the rotor, and control the inverter 220 to supply the three-phase ac driving voltages Vua, Vvb and Vwc at the start-up time point.

The reference start-up time point may be a time point when each of the three-phase ac driving voltages Vua, Vvb and Vwc is supplied when the electrical angle position of the rotor is a predetermined reference position.

The control unit 240 may change the reference start-up time point to the start-up point moved in correspondence with a difference between the electrical angle position of the rotor and the reference position.

The control unit 240 may change the start-up time point per rotation of the rotor and output the PWM signal PWMS to the inverter 220 so as to supply the three-phase ac driving voltages Vua, Vvb and Vwc according to the start-up time point.

In the motor driving apparatus according to the embodiment, the three-phase switching elements of the inverter are switched on and off once per rotation of the rotor according to the electrical angle position of the rotor included in the motor so as to control the level and frequency of the voltage output from the motor, thereby maximizing switching efficiency of the inverter.

The terms "comprises," "includes", or "has" as recited herein should be interpreted not to exclude other elements but to further include such other elements since the corresponding elements may be inherently present unless mentioned otherwise.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

What is claimed is:

1. A motor driving apparatus comprising:
    a motor including a stator and a rotor rotating in the stator;
    an inverter configured to supply a driving voltage to a stator coil wound on the stator or to cut off the driving voltage supplied to the stator coil; and
    a control unit configured to, when a target command value is received, set a start-up period for supplying the driving voltage per rotation of the rotor, according to an electrical angle position of the rotor estimated based on at least one of a voltage, current and counter electromotive force detected in the stator coil and the target command value, and to control the inverter to supply the driving voltage in the start-up period,
    wherein the control unit changes the start-up time point and start-up time for supplying the driving voltage, included in the start-up period once per rotation of the rotor.

2. The motor driving apparatus according to claim 1, wherein:
the stator coil includes first to third coils, and
the inverter includes:
a first switching unit connected to the first coil in parallel and including complementarily operating first upper-arm and lower-arm switches;
a second switching unit connected to the second coil in parallel and including complementarily operating second upper-arm and lower-arm switches; and
a third switching unit connected to the third coil in parallel and including complementarily operating third upper-arm and lower-arm switches.

3. The motor driving apparatus according to claim 2, wherein each of the first to third upper-arm switches and the first to third lower-arm switches is switched on and off per rotation of the rotor, under control of the control unit.

4. The motor driving apparatus according to claim 2, wherein:
each of the first to third upper-arm switches is switched on in the start-up period, and
at least one of the first to third upper-arm switches performs ON operation in a portion of the start-up period.

5. The motor driving apparatus according to claim 2, wherein at least one of the first and second upper-arm switches and the third lower-arm switch performs ON operation in a portion of the start-up period.

6. The motor driving apparatus according to claim 1, wherein the control unit includes:
a position estimator configured to detect at least one of the current, the voltage and the counter electromotive force from the stator coil and to estimate the electrical angle position of the rotor;
a speed calculator configured to calculate a current speed of the rotor based on the electrical angle position of the rotor and the voltage;
a command value generator configured to generate a current command value according to the current speed and the target command value and to generate a voltage command value based on the current command value and the current; and
a signal generator configured to change a reference start-up period corresponding to the current command value and the voltage command value to the start-up period based on the electrical angle position of the rotor and to generate and output an operation control signal to the inverter so as to supply the driving voltage in the start-up period.

7. The motor driving apparatus according to claim 6, wherein the signal generator changes a reference driving time point and a reference driving time included in the reference start-up period to a start-up time point and start-up time for supplying the driving voltage, based on the electrical angle position of the rotor and a lead angle of the voltage, and generates and outputs the operation control signal corresponding to the start-up period including the start-up time point and the start-up time.

8. The motor driving apparatus according to claim 6, wherein the signal generator changes a reference driving time point and a reference driving time included in the reference start-up period to a start-up time point and start-up time for supplying the driving voltage, based on the electrical angle position of the rotor and a lag angle of the voltage and generates and outputs the operation control signal corresponding to the start-up period including the start-up time point and the start-up time.

9. The motor driving apparatus according to claim 6, wherein the signal generator compensates for the electrical angle position of the rotor based on a duty ratio and a lead angle of the voltage, changes a reference driving time point and a reference driving time included in the reference start-up period to a start-up time point and start-up time for supplying the driving voltage, based on the compensated electrical angle position of the rotor, and generates and outputs the operation control signal corresponding to the start-up period including the start-up time point and the start-up time.

10. The motor driving apparatus according to claim 6, wherein the signal generator changes the reference start-up period to the start-up period according to an optimal driving point calculated based on the electrical angle position of the rotor and the voltage.

11. The motor driving apparatus according to claim 10, wherein the signal generator calculates an output power value corresponding to the target command value in order to calculate the optimal driving point according to the below equation:

$$P=3/2(v_d i_d + v_q i_q)$$

where, P denotes the output power value, $v_d$ denotes a d-axis voltage command value of the voltage command value, $i_d$ denotes a d-axis current command value of the current command value, $v_q$ denotes a q-axis voltage command value of the voltage command value and $i_q$ denotes a q-axis current command value of the current command value.

12. The motor driving apparatus according to claim 11, wherein the signal generator changes the reference start-up time point and the reference start-up time included in the reference start-up period to the start-up time point and start-up time for supplying the driving voltage according to the electrical angle position of the rotor and the output power value and generates and outputs the operation control signal corresponding to the start-up period including the start-up time point and the start-up time.

13. The motor driving apparatus according to claim 1, wherein the control unit supplies a reference driving voltage to the stator coil and detects at least one of the voltage, the current and the counter electromotive power detected in the stator coil, when the motor initially starts up according to the target command value.

14. The motor driving apparatus according to claim 1, wherein the start-up period includes the start-up time point, the start-up time and an off time for cutting off the driving voltage, per rotation of the rotor.

15. The motor driving apparatus according to claim 14, wherein the start-up time is equal to or less than the off time.

* * * * *